United States Patent [19]

Halfacre

[11] Patent Number: 5,304,736
[45] Date of Patent: Apr. 19, 1994

[54] ELECTRICAL CORD HOUSING

[76] Inventor: Van Halfacre, P.O. Box 1438, Manila, Ark. 72442

[21] Appl. No.: 915,656

[22] Filed: Jul. 21, 1992

[51] Int. Cl.$^5$ .............................................. H02G 3/26
[52] U.S. Cl. ..................... 174/48; 174/68.3; 220/8; 220/324
[58] Field of Search ................ 174/48, 68.3, 101; 220/4.02, 8, 324

[56] References Cited

U.S. PATENT DOCUMENTS

| | | | |
|---|---|---|---|
| 2,867,681 | 1/1959 | Huehnel | 174/101 |
| 2,945,081 | 7/1960 | Bogese et al. | 174/101 X |
| 3,126,444 | 3/1964 | Taylor | 174/101 |
| 3,823,251 | 7/1974 | Heithecker | 174/48 |
| 3,889,044 | 6/1975 | Flachbarth et al. | 174/48 |
| 4,156,795 | 5/1979 | Lacan | 174/48 X |
| 4,902,852 | 2/1990 | Wuertz | 174/48 |

Primary Examiner—Leo P. Picard
Assistant Examiner—David A. Tone
Attorney, Agent, or Firm—Dowell and Dowell

[57] ABSTRACT

A housing assembly for covering an electrical cord extending from a source of electrical supply to a fixture or appliance in which the assembly includes at least one mounting bracket and a cover and wherein portions of the bracket bite into the opposite sidewalls of the cover to thereby retain the cover in fixed position over the electrical cord.

14 Claims, 1 Drawing Sheet

ELECTRICAL CORD HOUSING

BACKGROUND OF THE INVENTION

1. Field of the Invention

This invention is generally directed to electrical conduits and/or housings and, more specifically, to an elongated housing assembly for covering electrical cords of the type which extend from an electrical socket or other source of power supply to a fixture, such as a lamp, mounted to a wall or an appliance such as a television.

2. History of the Related Art

Generally, electrical power supply to electrical fixtures including freestanding floor and table lamps or wall mounted lamps, and to electrical appliances such as radios, stereos, televisions and the like, is provided by plugging the electrical cord of the fixture or appliance into a wall mounted electrical socket which is hardwired to a main circuit breaker box. To prevent injury from individuals contacting live electrical lines and to prevent the threat of fire, electrical sockets are enclosed within junction boxes or housings embedded within the walls of a structure. Such sockets are normally installed in predetermined locations during initial building construction based upon local building codes and also upon a builder's, architect's, owner's, or commercial or interior designer's plan for where various appliances and fixtures will be located or placed into use. It is preferred that electrical cords associated with such fixtures and appliances not be prominently exposed, not only because such cords are unaesthetic in appearance, but because exposed cords can create safety hazards. For instance, cords extending along a floor can accidently be engaged by a person walking through a room thereby the person may possibly trip over the cord causing personal injury or causing the fixture or appliance to which the cord is attached to be pulled from its support by the force exerted on the cord. In addition, electrical cords which are left dangling along walls are attractive nuisances for small children and pets and are often the cause of appliances being pulled from tables or shelves.

In many environments it is possible to utilize home or office furnishings to provide a protective barrier to exposed electrical cords. By properly utilizing the placement of tables, chairs, sofas, beds and the like, it is possible that many electrical cords are obscured from view. However, in many instances, it is not possible nor practical to utilize furnishings as barriers for electrical cords or electrical extensions. It is also not practical when considering remodeling, upgrading or redecorating of home or commercial space to re-hardwire the electrical wiring in order to facilitate the aesthetic and safe placement of electrical wiring for providing power to appliances and fixtures, especially due to the cost involved with having to run wiring within walls and to repair any damage done during the rewiring.

In view of the foregoing, it has been proposed in instances where the repositioning or installation of electrical appliances and/or fixtures is desired to redecorate or renovate a given structure, that power to such appliances or fixtures may be conveyed through extension cords which are protectively encased within housings which may be mounted to the exterior surface of a wall. By way of example, in many hotels and motels as well as other commercial establishments, electrical lamps are mounted to the walls of a room at locations such as above a bed or adjacent a reading chair or desk. Often, such lamps are installed during renovation or after initial construction and are therefore not directly hardwired into the electrical system. In order to supply power to such lamps or lights, their electrical cords are housed or enclosed within an elongated box-like channel or conduit which may extend horizontally and vertical with respect to a wall and which may be decorative in appearance so as to appear to be part of the overall room design. Such housings normally extend to an area adjacent the nearest wall socket. In this manner, not only is it possible to confine the electrical cord in an aesthetic manner, but it is also possible to prevent accidental tampering or engagement of the electrical cord except at an area adjacent to where the cord is connected to the electrical socket.

Previously, such elongated protective covers or housings have been constructed utilizing a pair of opposing generally U-shaped channels. The first channel forms an elongated bracket which is mounted with its base against the surface of a wall and may include horizontal or vertical sections. Once the base has been installed, the electrical cord is extended through the channel defined by the base and thereafter a cover is placed over the base member and is secured thereto by mechanical fasteners such as by conventional screws. In cross section, such housings are generally rectilinear in configuration and define an open channel through which the electrical cord is extended. Unfortunately, such conventional housings are easily tampered with in that the conventional mechanical fasteners may be easily removed thereby allowing covers to be separated and allowing exposure of the electrical cords. In addition, although such protective housings for exterior wiring reduces the installation costs, there remains a significant cost for providing two pairs of elongated channels to form a single decorative and protective housing for electrical wiring.

SUMMARY OF THE INVENTION

This invention is directed to a housing assembly for covering and protecting electrical cords associated with electrical appliances and fixtures and, more particularly, to a housing assembly which is designed to present an aesthetically pleasing appearance for encasing or enclosing such electrical cords exteriorly of a wall surface. The invention includes at least one wall mounting bracket which is generally U-shaped in cross-sectional configuration having a base portion which is designed to be mechanically secured to a wall and which includes a pair of spaced side walls which extend generally perpendicularly outwardly with respect to the base. The wall mounting bracket is preferably formed of steel or other material having a first degree of hardness and, in the preferred embodiment, includes angled barbs which extend outwardly from each of the side walls. The barbs have elongated outer edges which are oriented toward the wall upon which the bracket is mounted and each of the barbs extends at an angle along the length of each side wall with each barb being angled in a different direction relative to one another.

The housing assembly of the present invention further includes an elongated cover which is also generally U-shaped in cross-sectional configuration having a outer surface and a pair of spaced side walls extending generally perpendicularly therefrom. The side walls of the cover ar spaced at a first distance measured between their inside surfaces which is substantially identical to the spacing between the outside surfaces of the side walls of the wall mounting bracket. The cover is preferably formed of aluminum or a second material having a degree of hardness which is less than the first degree of hardness of the wall mounting bracket so that as the housing is forced over the mounting bracket, the barbs associated with the bracket will bite into and securely retain the cover in fixed relationship with respect to the bracket. Because of the angled relationships of the barbs associated with the bracket, any longitudinal shifting of the housing cover relative to the bracket is prevented and the barbs will ensure that the cover cannot be disengaged due to the biting engagement between the barbs and the inner side wall surfaces of the cover.

In the preferred embodiment, two wall mounting brackets are provided in spaced relationship with respect to one another with each bracket being substantially less in longitudinal dimension than the cover, thereby effectively saving resources in material costs.

It is a primary object of the present invention to provide a safe and secure exterior wall housing in which electrical cords may be extended and which is constructed utilizing a minimum of material thereby reducing construction and material costs.

It is another object of the present invention to provide a safety cover which is aesthetic in appearance and which may be utilized to enclose an electrical cord or extension cord extending from a conventional wall outlet to an appliance or fixture wherein the assembly includes brackets which are mounted to the wall and which are used to engage a protective cover without the use of conventional fasteners and with the area of engagement being confined within the protective cover so that tampering with the engagement between the bracket and the cover is effectively prevented.

DESCRIPTION OF THE PREFERRED EMBODIMENT

Figure 1:
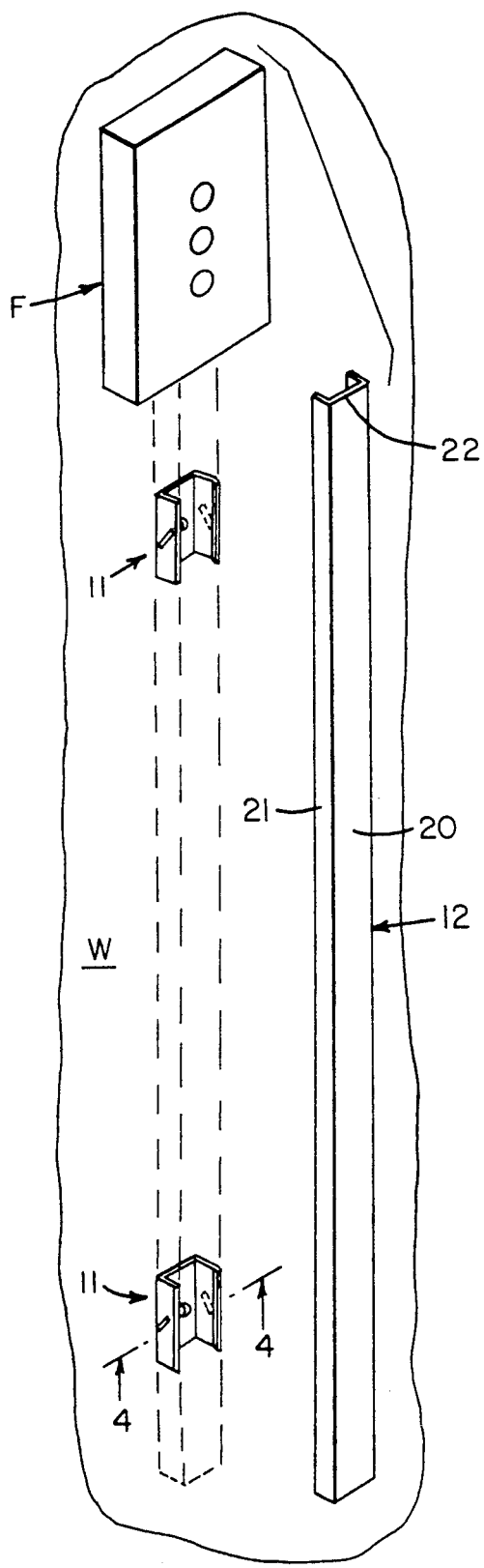
FIG. 1 is a perspective assembly view of the preferred embodiment of the present invention showing a pair of vertically spaced wall mounting brackets mounted to a wall in vertically spaced relationship with respect to a lamp base and to which the cover of the present invention is selectively and securely engaged so as to provide an enclosure through which an electrical cord extending from the lamp base to an electrical socket may extend.

With continued reference to the drawings, the housing assembly 10 of the present invention includes one or more wall anchors or brackets 11 and an outer elongated cover 12. The housing is designed to provide a protective cover for an electrical cord C which extends from an appliance or fixture F, such as a lamp base, mounted to a wall W, so that the electrical cord is essentially encased or enclosed between the fixture and an electrical wall socket (not shown). Although the embodiment of the present invention will be discussed with regard to positioning the electrical housing vertically on a wall, it should be noted that the housing may be utilized along horizontal runs as well as vertical runs and, in some instances, may include both horizontal and vertical sections.

The wall anchors or mounting brackets 11 are shown as being generally U-shaped in cross-sectional configuration having a base portion 13 and parallel side wall portions 14 and 15. Each bracket is designed to be mounted to a wall by at least one conventional fastener which passes through one or more openings 16 which are formed generally centrally of the base 13. Although, in the embodiment shown, two vertically spaced brackets are disclosed, it should be noted that within the teachings of the present invention, one or more such brackets may be utilized. If only a single bracket is to be utilized, then several mounting holes 16 should be provided so as to prevent any rotational twisting of the bracket when installed against the wall. Further, in those instances where only a single bracket is to be utilized, the length of the bracket may be increased somewhat with respect to the embodiment shown.

Figure 2:
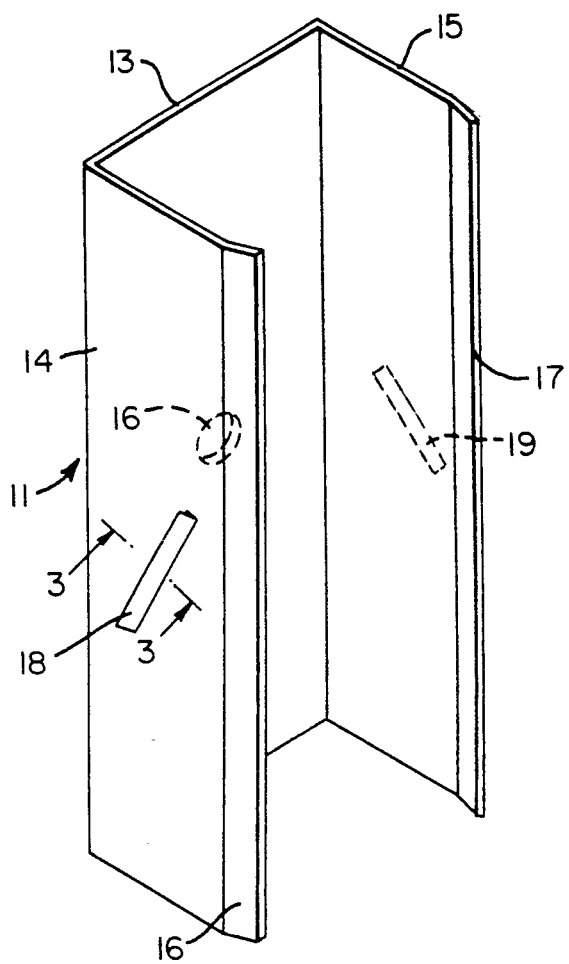
FIG. 2 is an enlarged perspective view of one of the wall mounting brackets of the present invention showing the diagonally extending barbs which are utilized to engage the opposing side walls of the cover of the present invention and showing the barbs oppositely angled relative to one another along the length of the side walls of the brackets.

With specific reference to FIG. 2 of the drawings, each of the side walls 14 and 15 include an outermost bevelled edge 16 and 17, respectively, for purposes of facilitating the installation of the cover 12, as will be discussed in greater detail hereinafter.

Figure 3:
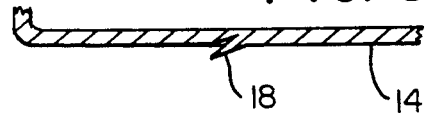
FIG. 3 is an enlarged cross-sectional view taken along lines 3—3 of FIG. 2.

Each side wall also includes at least one elongated barb 18 and 19, respectively, which extends diagonally from the front bevelled edges toward the base of the bracket and which are angled outwardly with respect to the bracket so that the elongated edges of each barb are oriented toward the wall surface. As specifically shown in FIG. 3, each barb 18 and 19 is preferably integrally formed or cut along each side wall of the bracket. Further, barb 18 is shown as being angled downwardly from the front bevelled edge 16 towards the base, while barb 19 is shown as being angled upwardly from the front bevelled edge 17 towards the base 13. The opposite shifting of the cover 12 once the cover is placed over the mounting bracket.

The brackets 11 are preferably formed of a first material having a high degree of hardness such as steel. The cover, on the other hand, is preferably formed of a material which is softer having a second degree of hardness and, in manner, when the cover is placed over the brackets 11, the barbs 18 and 19 will cut and bite into the walls of the cover.

Figure 4:
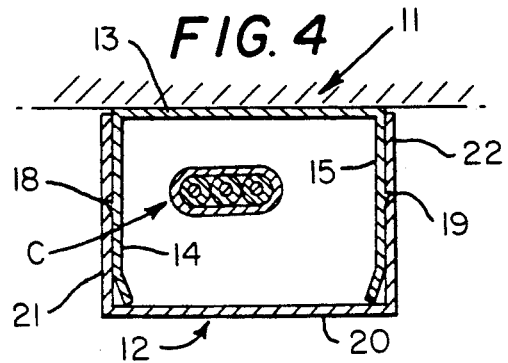
FIG. 4 is an enlarged cross-sectional view taken along lines 4—4 of FIG. 1 when the cover is assembled to the spaced wall mounting brackets and showing an electrical cord extending within the housing assembly.

The cover includes an outer surface 20 and parallel side walls 21 and 22. As with the brackets 11, the cover 12 is generally U-shaped in cross-sectional configuration and the spacing between the interior surfaces of the side walls 21 and 22 is substantially equal to the spacing between the exterior surfaces of the side walls 14 and 15 of each bracket 11, as is shown clearly in FIG. 4. In this manner, when the cover is installed over the brackets, the bevelled edges 16 and 17 of each bracket will allow the cover to be easily placed in covering engagement therewith. Thereafter, the cover is urged into a fully seated position, as is shown in FIG. 4, with respect to the brackets, at which point the and 22 of the cover thereby preventing the removal of the cover from the brackets.

In use, once it is determined where a fixture or appliance is to be placed, one or more wall mounting brackets 11 are installed against a wall surface by the use of conventional fasteners (not shown). Thereafter, a given length of cover is determined and cut to appropriate length after which the cover is aligned with the bracket or brackets and thereafter forced into seated engagement with the brackets without the need of additional mechanical fasteners. With this structure, there are no exposed mechanical fasteners which may be tampered with to cause the separation of the cover from the brackets and any electrical cord extending beneath the cover and between the brackets and the cover is effectively protected. As previously discussed, both horizontal and vertical runs may be made utilizing the brackets and cover of the present invention.

I claim:

1. A housing assembly for covering an electrical cord extending along a structural wall to a fixture or appliance comprising an elongated cover having a generally U-shaped cross section, said cover having a front wall and opposite side walls, said side walls of said cover having inner and outer surfaces, at least one wall mounting bracket having a base portion and opposite side walls extending outwardly therefrom, said side walls of said bracket having inner and outer surfaces, means for securing said base to the structural wall, a barb protruding outwardly from each of said outer surfaces of said side walls of said bracket, said barbs being engageable with said inner surfaces of said side walls of said cover, and said mounting bracket being formed of a first material having a first degree of hardness and said cover being formed of a second material having a second degree of hardness which is less than said first material so that said barbs of said bracket will bite into the second material of said cover when said cover is mounted in overlying engagement with said bracket.

2. The housing assembly of claim 1 in which said bracket is formed of steel and said cover is formed of aluminum.

3. The housing assembly of claim 1 in which said barbs are elongated having an outer edge which is oriented rearwardly towards said base of said bracket.

4. The housing assembly of claim 3 in which each of said barbs is inclined along the length of said side walls of said bracket.

5. The housing assembly of claim 4 in which said barbs of each bracket are inclined at different angles relative to one another.

6. The housing assembly of claim 5 in which each of said side walls of said bracket includes an outer edge, said outer edges being bevelled towards one another along the length of said bracket.

7. The housing assembly of claim 1 including at least two spaced mounting brackets.

8. A housing assembly for covering an electrical cord extending along a structural wall to fixture or appliance comprising, an elongated cover having a generally U-shaped cross section, said cover having a front wall and opposite side walls, said side walls of said cover having inner and outer surfaces, at least one wall mounting bracket having a base portion and opposite side walls extending outwardly therefrom, said side walls of said bracket having inner and outer surfaces, means for securing said base to the structural wall, a barb protruding outwardly from each of said outer surfaces of said side walls of said bracket, said barbs being elongated and having an outer edge which extends at an incline along said side walls of said bracket rearwardly towards said base of said bracket, and said barbs being engageable with said inner surfaces of said side walls of said cover to thereby retain said cover in overlying relationship with respect to said bracket.

9. The housing assembly of claim 8 in which said barbs of said bracket are inclined at different angles relative to one another.

10. The housing assembly of claim 9 in which each of said side walls of said bracket includes an outer edge, said outer edges being bevelled towards one another along the length of said bracket.

11. The housing assembly of claim 8 in which each of said side walls of said bracket includes an outer edge, said outer edges being bevelled towards one another along the length of the bracket.

12. A housing assembly for covering an electrical cord extending along a structural wall to a fixture or appliance comprising, an elongated cover having a generally U-shaped cross section, said cover having a front wall and opposite generally parallel side walls, said side walls of said cover having inner and outer surfaces, at least one wall mounting bracket having a base portion and opposite generally parallel side walls extending outwardly therefrom, said side walls of said bracket having inner and outer surfaces, means for securing said base to the structural wall, a barb protruding outwardly from each of said outer surfaces of said side walls of said bracket and being inclined relative thereto, each barb being oriented at a different angle relative to one another, and said barbs being engageable with said inner surfaces of said side walls of said cover to thereby retain said cover in overlyng relationship with respect to said bracket.

13. The housing assembly of claim 12 in which said mounting bracket is formed of a first material having a first degree of hardness and said cover is formed of a second material having a second degree of hardness which is less than said first material so that said barbs of said bracket will bite into the second material of said cover when said cover is mounted in overlying engagement with said bracket.

14. The housing assembly of claim 13 in which said bracket is formed of steel and said cover is formed of aluminum.

* * * * *